US012645506B2

(12) United States Patent
Hawkins

(10) Patent No.: US 12,645,506 B2
(45) Date of Patent: Jun. 2, 2026

(54) SYSTEM AND METHOD FOR REALLOCATION OF GPU POWER

(71) Applicant: Jason Hawkins, Boynton Beach, FL (US)

(72) Inventor: Jason Hawkins, Boynton Beach, FL (US)

( * ) Notice: Subject to any disclaimer, the term of this patent is extended or adjusted under 35 U.S.C. 154(b) by 451 days.

(21) Appl. No.: 18/203,468

(22) Filed: May 30, 2023

(65) Prior Publication Data

US 2024/0403140 A1 Dec. 5, 2024

(51) Int. Cl.
G06F 9/50 (2006.01)
A63F 13/77 (2014.01)
G06T 1/60 (2006.01)

(52) U.S. Cl.
CPC .............. G06F 9/5094 (2013.01); G06T 1/60 (2013.01); *A63F 13/77* (2014.09)

(58) Field of Classification Search
USPC ........................................ 345/644
See application file for complete search history.

(56) References Cited

U.S. PATENT DOCUMENTS

| | | | | |
|---|---|---|---|---|
| 4,937,774 A * | 6/1990 | Malinowski | .............. | G06T 5/20 |
| | | | | 708/420 |
| 2010/0142824 A1* | 6/2010 | Lu | ............................. | G06T 7/97 |
| | | | | 382/275 |
| 2010/0274617 A1* | 10/2010 | Suomela | ................ | G06Q 30/02 |
| | | | | 455/566 |

| | | | | |
|---|---|---|---|---|
| 2012/0069035 A1* | 3/2012 | Bourd | ........................ | G06F 9/54 |
| | | | | 345/557 |
| 2012/0259843 A1* | 10/2012 | Child | ................ | G06F 16/24569 |
| | | | | 707/769 |
| 2015/0277877 A1* | 10/2015 | Feng | .......................... | G06F 8/51 |
| | | | | 717/160 |
| 2016/0114251 A1* | 4/2016 | Galic | ....................... | A63F 13/40 |
| | | | | 463/25 |
| 2016/0364829 A1* | 12/2016 | Apodaca | ................... | G06T 1/20 |
| 2022/0222397 A1* | 7/2022 | Jain | ........................ | G06F 9/4401 |
| 2024/0111530 A1* | 4/2024 | He | ........................... | G06F 7/483 |
| 2024/0320293 A1* | 9/2024 | Bhaskar | ............... | G06F 9/5066 |

* cited by examiner

*Primary Examiner* — James A Thompson
*Assistant Examiner* — Kim Thanh T Tran
(74) *Attorney, Agent, or Firm* — The Rapacke Law Group, P.A.

(57) ABSTRACT

A system for reallocating GPU power of a gaming console to non-gaming purposes, including a processor of the gaming console comprising a GPU and a memory on which are stored machine-readable instructions that when executed by the processor, cause the processor to: define a kernel function for matrix multiplication; pass three global memory pointers (A, B, and C) and an integer (N) as input arguments to the kernel function, wherein the arguments represent two matrices A and B being multiplied and their dimensions; calculate a product of the two matrices and store a result in an output matrix C; generate a control command queue based on the outputs of the kernel function for matrix multiplication; execute the control command queue to allocate memory on the GPU for the input and output matrices; copy the input matrices A and B from a gaming console memory to GPU memory; and execute a kernel on the GPU specifying a global work size for the kernel as a two-dimensional array.

20 Claims, 4 Drawing Sheets

SYSTEM AND METHOD FOR REALLOCATION OF GPU POWER

FIELD OF DISCLOSURE

The present disclosure generally relates to managing computing power of a computing device, and more particularly, to reallocating GPU power of a gaming console to non-gaming purposes.

BACKGROUND

While Graphic Processing Units (GPUs) are commonly used to render computer graphics for video games, there are a number of uses for GPUs other than gaming. The GPUs can be used for video editing, 3D graphics rendering, and much more. With a high processing throughput, the GPUs can process more data than their Central Processing Unit (CPU) counterparts, making them uniquely suited for highly demanding tasks such as machine learning and cryptocurrency mining.

However, conventional gaming consoles do not allow for GPU power reallocation for-non gaming purposes Accordingly, a system and method for reallocating GPU power of a gaming console to non-gaming purposes are desired.

BRIEF OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

One embodiment of the present disclosure provides a system for reallocating GPU power of a gaming console to non-gaming purposes. The system for reallocating GPU power of a gaming console to non-gaming purposes includes a processor of the gaming console comprising a GPU and a memory on which are stored machine-readable instructions that when executed by the processor, cause the processor to: define a kernel function for matrix multiplication; pass three global memory pointers (A, B, and C) and an integer (N) as input arguments to the kernel function, wherein the arguments represent two matrices A and B being multiplied and their dimensions; calculate a product of the two matrices and store a result in an output matrix C; generate a control command queue based on the outputs of the kernel function for matrix multiplication; execute the control command queue to allocate memory on the GPU for the input and output matrices; copy the input matrices A and B from a gaming console memory to GPU memory; and execute a kernel on the GPU specifying a global work size for the kernel as a two-dimensional array.

Another embodiment of the present disclosure provides a method that includes one or more of: defining a kernel function for matrix multiplication; passing three global memory pointers (A, B, and C) and an integer (N) as input arguments to the kernel function, wherein the arguments represent two matrices A and B being multiplied and their dimensions; calculating a product of the two matrices and store a result in an output matrix C; generating a control command queue based on the outputs of the kernel function for matrix multiplication; executing the control command queue to allocate memory on the GPU for the input and output matrices; copying the input matrices A and B from a gaming console memory to GPU memory; and executing a kernel on the GPU specifying a global work size for the kernel as a two-dimensional array.

Another embodiment of the present disclosure provides a computer-readable medium including instructions for defining a kernel function for matrix multiplication; passing three global memory pointers (A, B, and C) and an integer (N) as input arguments to the kernel function, wherein the arguments represent two matrices A and B being multiplied and their dimensions; calculating a product of the two matrices and store a result in an output matrix C; generating a control command queue based on the outputs of the kernel function for matrix multiplication; executing the control command queue to allocate memory on the GPU for the input and output matrices; copying the input matrices A and B from a gaming console memory to GPU memory; and executing a kernel on the GPU specifying a global work size for the kernel as a two-dimensional array.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings.

DETAILED DESCRIPTION

Figure 1:
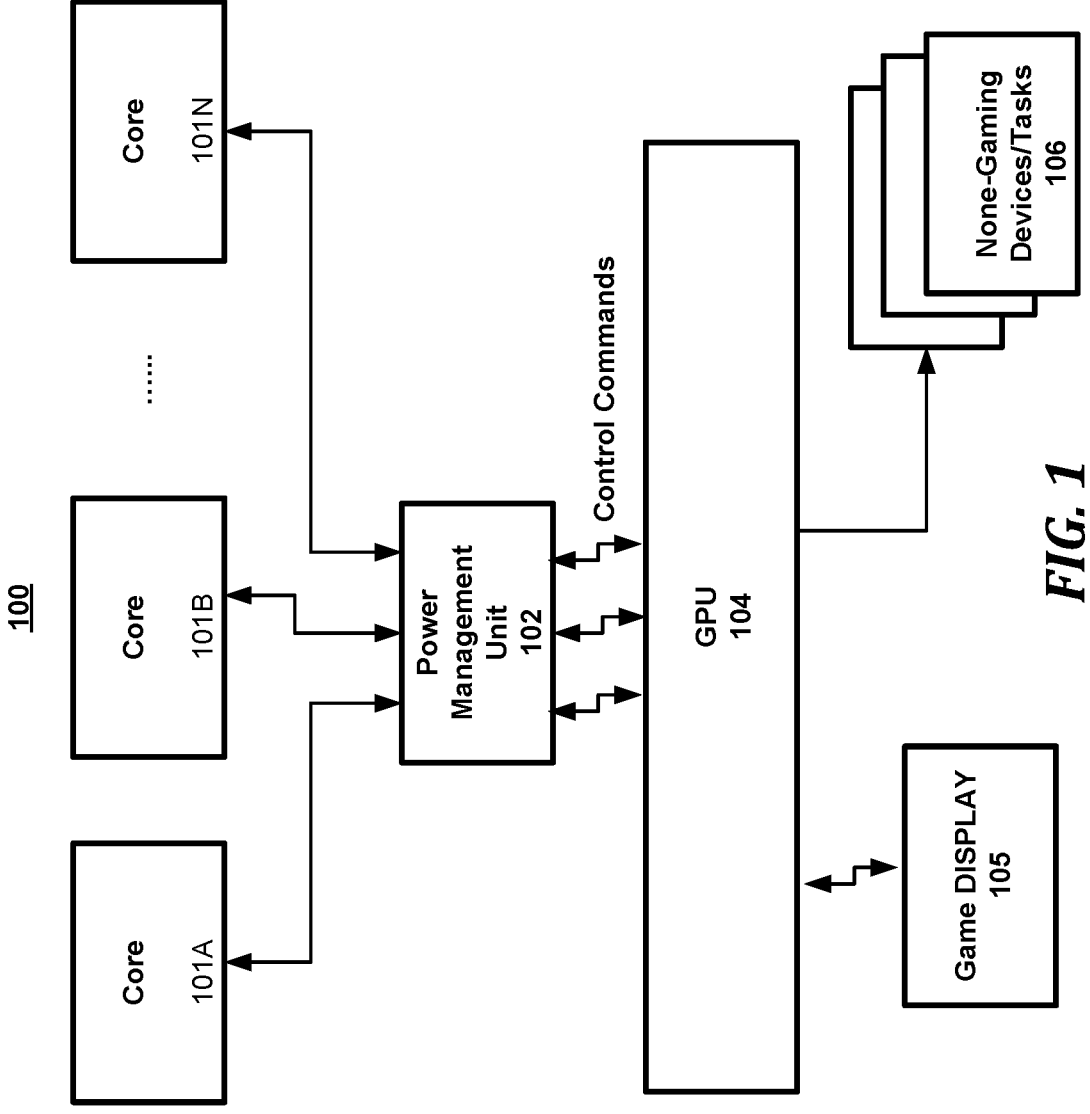
FIG. 1 illustrates a diagram of a system for reallocation of GPU power for non-gaming purposes consistent with the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of phone call-based recommendations, embodiments of the present disclosure are not limited to use only in this context.

The present disclosure provides a system, method and computer-readable medium for reallocation of GPU power for non-gaming purposes.

In one embodiment of the present disclosure, the system provides for reallocation of GPU power by generation of GPU control commands by a power management unit.

FIG. 1 illustrates a diagram of a console system for reallocation of GPU power for non-gaming purposes consistent with the present disclosure.

Referring to FIG. 1, the example console system 100 includes the CPU cores 101A-101N. These cores may be coupled to a power management unit 102. The power management unit 102 may be configured by the cores 101A-101N to generate control commands to a GPU 104. The control command may reallocate the GPU power from a game display 105 to non-gaming devices and tasks 106.

This process may be implemented as follows.

The console system 100 is powered on and connected to Wi-Fi. The gaming console system 100 may check for updates for non-gaming GPU usage being present on the console. If the updates are not present, the system may download system software update to allow latest version to utilize dormant GPU power from gaming console for computational power. Note that updates may come directly from the major manufacturers.

The general usage may include installation of appropriate drivers (i.e., OpenCL, DirectCompute, or DirectML). Any files may be installed as needed based on installed operating system. (i.e., libraries and dependencies). Installation of appropriate driver support may be needed for allowing graphic card to be recognized by operating system).

IF the is GPU supported-install Pytorch or Tensor Flow

Then, the system generates the necessary GPGPU code using either DirectCompute, DirectML, or OpenCL (will depend upon operating system).

Creation of the GPGPU code to utilize the GPU may be implemented as follows.

In case of Open CL, —the code defines kernel function for matrix multiplication using OpenCL's syntax for defining kernel functions. The kernel function takes three global memory pointers (A, B, and C) and an integer (N) as input arguments, representing the two matrices being multiplied and their dimensions. The kernel function calculates the product of the two matrices and stores the result in the output matrix C.

Code then initializes the OpenCL framework by querying the available OpenCL platforms and devices on the system, creating an OpenCL context and command queue for the device, and creating an OpenCL program and kernel from the matrix multiplication kernel function.

The execution code then allocates memory on the GPU for the input and output matrices using OpenCL's memory management functions. The bufferA and bufferB buffers are read-only buffers for the input matrices A and B, while the bufferC buffer is a write-only buffer for the output matrix C. Code then copies the input matrices A and B from host memory to GPU memory using OpenCL's command queue functions. The clEnqueueWrite Buffer function enqueues a command to write data from host memory to the specified buffer on the GPU.

Code then sets the arguments of the kernel function (i.e., the input and output matrices and the dimension size) using OpenCL's kernel argument-setting functions. The code then executes the kernel on the GPU using OpenCL's command queue functions, specifying the global work size for the kernel (i.e., the number of work-items to be executed) as a two-dimensional array with dimensions N×N.

Code then copies the output matrix C from GPU memory to host memory using OpenCL's command queue functions. The clEnqueueReadBuffer function enqueues a command to read data from the specified buffer on the GPU to the specified location in host memory. Once this command has completed, the result of the matrix multiplication operation is made available in the output matrix C in host memory.

Code then saves the data to a file or a database on the local system or a remote server, or use network communication protocols such as TCP/IP or HTTP to send the data to another device or system as required.

In one embodiment, the GPGPU code may be optimized for efficient GPU execution. If equipped with an AMD APU with specific hardware feature, leverage for performance gains may be implemented. For example, the APU includes a high-speed memory subsystem called the Infinity Cache, which can be used to optimize memory access patterns in the matrix multiplication code.

Local memory for caching may be used as follows: OpenCL provides a mechanism for allocating fast, on-chip memory called local memory. Using the local memory to cache frequently accessed data reduces the amount of time spent accessing global memory on the GPU, which can improve performance.

Multiple kernel instances may be used for optimization. Some devices have a large number of compute units (CU), which can be used to execute multiple kernel instances in parallel. By dividing the input matrices into smaller sub-matrices and executing multiple kernel instances in parallel on different sections of the data, code can fully utilize the available compute resources and maximize performance.

Asynchronous transfers may be used for optimization as well. Some devices have a high-speed SSD that can be used for asynchronous data transfers between the CPU and GPU. By using asynchronous transfers, the system can overlap data transfer and computation operations, which can improve performance and reduce latency.

In one embodiment, the console system may be config-ured to perform tracking to reward the gamer/user for their compute contributions for non-gaming purposes based on time running or tasks completed. A user can click on "Earn mode" as opposed to "Power Off" or "Sleep" and may use the GPU when inactive so the user can be prompted with this option prior to powering off or putting their console to sleep.

The system may reward gamer/user based on time or tasks completed by the GPU in Earn Mode on the gaming console.

In case of FREEBSD:

MESA driver is installed;

Install the clover package to install OpenCL (AMD pro-cessors);

The system creates code to support GPGPU (general-purpose computing on graphics processing units);

Install the appropriate driver support;

Install any necessary software libraries and dependencies for the GPGPU workload.

Run the GPGPU workload on the PS5 using the MESA driver, OpenCL, and the GPGPU code.

In case Open CL the code executes the following.

Code kernel function for matrix multiplication using OpenCL's syntax for defining kernel functions. The kernel function takes three global memory pointers (A, B, and C) and an integer (N) as input arguments, representing the two matrices being multiplied and their dimensions. The kernel function calculates the product of the two matrices and stores the result in the output matrix C.

Code then initializes the OpenCL framework by querying the available OpenCL platforms and devices on the system, creating an OpenCL context and command queue for the device, and creating an OpenCL program and kernel from the matrix multiplication kernel function.

Code then allocates memory on the GPU for the input and output matrices using OpenCL's memory management functions. The bufferA and bufferB buffers are read-only buffers for the input matrices A and B, while the bufferC buffer is a write-only buffer for the output matrix C.

Code then copies the input matrices A and B from host memory to GPU memory using OpenCL's command queue functions. The clEnqueueWriteBuffer function enqueues a command to write data from host memory to the specified buffer on the GPU.

Code then sets the arguments of the kernel function (i.e., the input and output matrices and the dimension size) using OpenCL's kernel argument-setting functions. It then executes the kernel on the GPU using OpenCL's command queue functions, specifying the global work size for the kernel (i.e., the number of work-items to be executed) as a two-dimensional array with dimensions N×N.

Code then copies the output matrix C from GPU memory to host memory using OpenCL's command queue functions. The clEnqueueReadBuffer function enqueues a command to read data from the specified buffer on the GPU to the specified location in host memory. Once this command has completed, the result of the matrix multiplication operation will be available in the output matrix C in host memory.

Code then saves the data to a file or a database on the local system or a remote server, or use network communication protocols such as TCP/IP or HTTP to send the data to another device or system as required.

The GPGPU code may be optimized for efficient GPU execution.

If equipped with an AMD APU with specific hardware feature, leverage for performance gains may be achieved. For example, the APU includes a high-speed memory sub-system called the Infinity Cache, which can be used to optimize memory access patterns in the matrix multiplica-tion code.

Local memory for caching may be used for optimization. OpenCL provides a mechanism for allocating fast, on-chip memory called local memory. Using the local memory to cache frequently accessed data reduces the amount of time spent accessing global memory on the GPU, which can improve performance.

Multiple kernel instances may be used for optimization. Some devices have a large number of compute units (CU), which can be used to execute multiple kernel instances in parallel. By dividing the input matrices into smaller sub-matrices and executing multiple kernel instances in parallel on different sections of the data, code can fully utilize the available compute resources and maximize performance.

The asynchronous transfers may contribute to optimization. Some devices have a high-speed SSD that can be used for asynchronous data transfers between the CPU and GPU. By using asynchronous transfers, the system can overlap data transfer and computation operations, which can improve performance and reduce latency.

In one embodiment, tracking to reward users for their compute contributions based on time running or tasks completed may be implemented.

As discussed above, the console system may be configured to perform tracking to reward the gamer/user for their compute contributions for non-gaming purposes based on time running or tasks completed. A user can click on "Earn mode" as opposed to "Power Off" or "Sleep" and may use the GPU when inactive so the user can be prompted with this option prior to powering off or putting their console to sleep.

The system may reward gamer/user based on time or tasks completed by the GPU in Earn Mode on the gaming console.

In one embodiment, the system may be configured to reward the gamers while also not in earn mode. For instance, if a gamer is playing a game like Tetris which is not computationally resource heavy, the system can redirect the GPU usage for non-gaming purposes while the user is playing the game. Accordingly, while the "Earn mode" is one advantageous implementation of using the GPU power when the console is not in active use, the GPU can also be used if there is spare computational power not being used when a device is in use in a game mode.

In case of Windows™ OS:

Install the latest graphics drivers for the Windows Based Gaming Console (i.e., Xbox);

Install the latest version of the necessary components for DirectCompute and DirectML are present (Windows specific);

Install the latest version of the chip manufacturers driver (to ensure use of the necessary components for OpenCL);

Install the OpenCL header files and libraries to enable development with OpenCL.

The necessary GPGPU code may be generated using either DirectCompute, DirectML, OpenCL, Vulkan, or Metal.

The code may Initialize the Direct3D 12 API:

To use DirectML or DirectCompute on a Windows gaming console (such as Xbox), one first need to initialize the Direct3D 12 API. This involves creating a device, a command queue, and a command allocator.

Create a DirectML or DirectCompute device by querying the Direct3D 12 device for the appropriate interface. For DirectML, one would create an IDMLDevice interface, while for DirectCompute, one would create an ID3D12Device interface.

The system may create the input matrices A and B and the output matrix C in system memory. These matrices will be used for the matrix multiplication operation.

Allocate memory on the GPU for the input matrices A and B and the output matrix C using the Direct3D 12 device's memory allocation functions.

Copy the input matrices to GPU memory by using the Direct3D 12 device's copy functions to copy the input matrices A and B from system memory to GPU memory.

Create a compute shader that performs the matrix multiplication operation. For DirectML, this would be done using the DirectML API, while for DirectCompute, this would be done using the Direct3D 12 compute shader language. Bind the input and output buffers to the compute shader using the Direct3D 12 device's binding functions. Dispatch the compute shader using the Direct3D 12 command queue's dispatch function, specifying the number of threads to use for the computation.

Use the Direct3D 12 device's copy functions to copy the output matrix C from GPU memory to system memory. Use the output matrix C as needed, such as sending it to a display, saving it to disk, using it for further computation or saves the data to a file or a database on the local system or a remote server, or use network communication protocols such as TCP/IP or HTTP to send the data to another device or system as required.

The GPGPU code may be optimized as follows.

The memory management may be improved as following: instead of copying all the input matrices A, B, and C from host memory to GPU memory at once, split the data into smaller chunks and copy them iteratively. This can help reduce the overall memory usage and improve performance.

Use of multiple kernels: use multiple kernels to perform different parts of the matrix multiplication operation, such as matrix transposition, dot product calculation, and output matrix assembly. Using multiple kernels optimizes each kernel for the specific task it performs, and better utilizes the GPU's parallel processing capabilities.

Optimize data transfer: optimize the data transfer between the host and GPU by using pinned memory or zero-copy memory. Pinned memory can improve data transfer rates by reducing memory allocation overhead, while zero-copy memory can eliminate the need to copy data between the host and GPU altogether.

Use of shared memory: use shared memory to enable data sharing between threads within a workgroup. This can help reduce memory latency and improve performance by reducing the number of global memory accesses.

Use loop unrolling: use loop unrolling to optimize the kernel's execution by reducing the number of iterations and increasing instruction-level parallelism. This can help improve performance by reducing loop overhead and increasing the number of instructions executed per cycle.

Install tracking to reward users for their compute contributions for non-gaming purposes based on time running or tasks completed.

Create an "Earn mode" (similar to sleep mode) which uses the GPU when inactive so the user can be prompted with this option prior to powering off or putting their console to sleep. Reward gamer/user based on time or tasks completed by the GPU for non-gaming purposes in the "Earn Mode" on the gaming console.

In case of Android™:

Install appropriate drivers (OpenCL or Vulkan);

Install any files as needed based on installed operating system;

Install appropriate driver support (allows graphic card to be recognized by operating system);

Create the necessary GPGPU code using OpenCLor Vulkan.

Create the GPGPU code to utilize the GPU.

Select a programming language and library that supports GPGPU computation on the Oculus device. One option is to use the Oculus Mobile SDK, which supports OpenGL ES and Vulkan. Other options include using third-party libraries such as OpenCL or CUDA.

Code the kernel function for the GPGPU operation using the syntax of the chosen library. The kernel function should take input data, perform the desired operation using the GPU, and output the result.

Initialize the GPGPU framework on the Oculus device using the initialization functions provided by the chosen library. This involves creating a context, command queue, and program, and compiling the kernel function.

Allocate memory on the GPU for the input and output data, using the memory management functions provided by the chosen library.

Copy the input data from host memory to GPU memory using the library's command queue functions. Set the arguments of the kernel function (i.e., the input and output data) using the library's kernel argument-setting functions. Execute the kernel function on the GPU using the library's command queue functions, specifying the global work size for the kernel. Copy the output data from GPU memory to host memory using the library's command queue functions.

Use the output data in further processing, such as in machine learning models or AI algorithms. Optimize the GPGPU code for efficient GPU execution. Install tracking to reward users for their compute contributions based on time running or tasks completed. Create an "Earn mode" (similar to sleep mode) which uses the GPU when inactive so the user can be prompted with this option prior to powering off or putting their console to sleep. Reward gamer/user based on time or tasks completed by the GPU in the "Earn Mode" on the gaming console.

Alternative Approach:

Modify the firmware to enable I/O virtualization support.

Modify the operating system's kernel and device drivers to recognize and pass through the GPU to a virtual machine.

Create a custom hypervisor or modify an existing one to enable GPU passthrough. Determine the compatibility of the GPU with the programming API (e.g., OpenCL, Vulkan, DirectX, etc.). Install additional software or libraries required for the GPGPU programming environment.

Create GPGPU code to take advantage of parallel processing on the GPU.

Initialize the OpenCL platform and device: the code first initializes the OpenCL platform and the device by calling clGetPlatformIDs and clGetDeviceIDs functions, respectively.

Create a context: create a context for the device using the clCreateContext function. Create a command queue: A command queue is created using clCreateCommandQueue function which is used to enqueue kernels for execution on the device. Allocate GPU memory: the clCreateBuffer function is used to allocate memory on the device. This function takes in the context, a memory flag, the size of the memory buffer to allocate, and a pointer to the buffer that will hold the allocated memory.

Create a kernel: a kernel is created using clCreateKernel function. The kernel is a function that runs on the device and performs a specific task. Set kernel arguments: the clSetKernelArg function is used to set the arguments of the kernel. This function takes in the kernel, the argument index, the size of the argument, and a pointer to the argument. Enqueue kernel for execution: the kernel is enqueued for execution on the device using clEnqueueNDRangeKernel function. This function takes in the command queue, the kernel, the number of dimensions of the work-group, the global work size, and the local work size.

Read the results back: the results of the computation are read back from the device using clEnqueueReadBuffer function. This function takes in the command queue, the buffer to read, a blocking flag, the offset, the size of the memory to read, and a pointer to the host buffer that will hold the results.

Release resources: finally, the resources used by the program are released using the clRelease functions. Optimize code to minimize data transfer between the CPU and GPU, and to minimize idle time on the GPU. Install tracking to reward users for their compute contributions for non-gaming purposes based on time running or tasks completed.

Create an "Earn mode" (similar to sleep mode) which uses the GPU when inactive so the user can be prompted with this option prior to powering off or putting their console to sleep.

Reward gamer/user based on time or tasks completed by the GPU in the "Earn Mode" on the gaming console.

Use browser with WEBGPU support (allows user alternate way to provide GPU power). Provide user with URL dedicated to providing GPU power from their gaming console browser (WEBGPU can be installed on a website).

Provide timer which counts users compute contribution by time or tasks. Reward user based on time on the browser in gaming console or tasks which the GPU completes. Using the Updated System for Real AI/ML Video Games.

Determine which GPGPU programming API is appropriate for the task depending upon gaming console, such as DirectCompute or DirectML for Windows-based consoles or Vulkan for Android-based consoles or OpenCL for Free-BSD.

Install the necessary drivers, libraries, and dependencies for the selected GPGPU programming API. Modify the game's source code to include the necessary GPGPU code to perform the non-gaming task using the GPU.

Compile and test the modified game to ensure that it performs the non-gaming task efficiently and effectively. Reward user based on time in game (as it contributes their GPU power) or AI tasks completed in-game console or tasks which the GPU completes.

With above modifications completed, the gaming console can now accept purpose-built AI/ML games where users can provide RLHF (Reinforcement learning from human feedback). Gamers can play AI games where they complete tasks, answer questions, and get rewarded for doing so. A system update would be required for such a game to be utilized. This is in addition to the software/system update which enables the usage of GPU power by easily selecting the prompt to initiate the utilization of the GPU computational power for non-gaming purposes.

Figure 2:
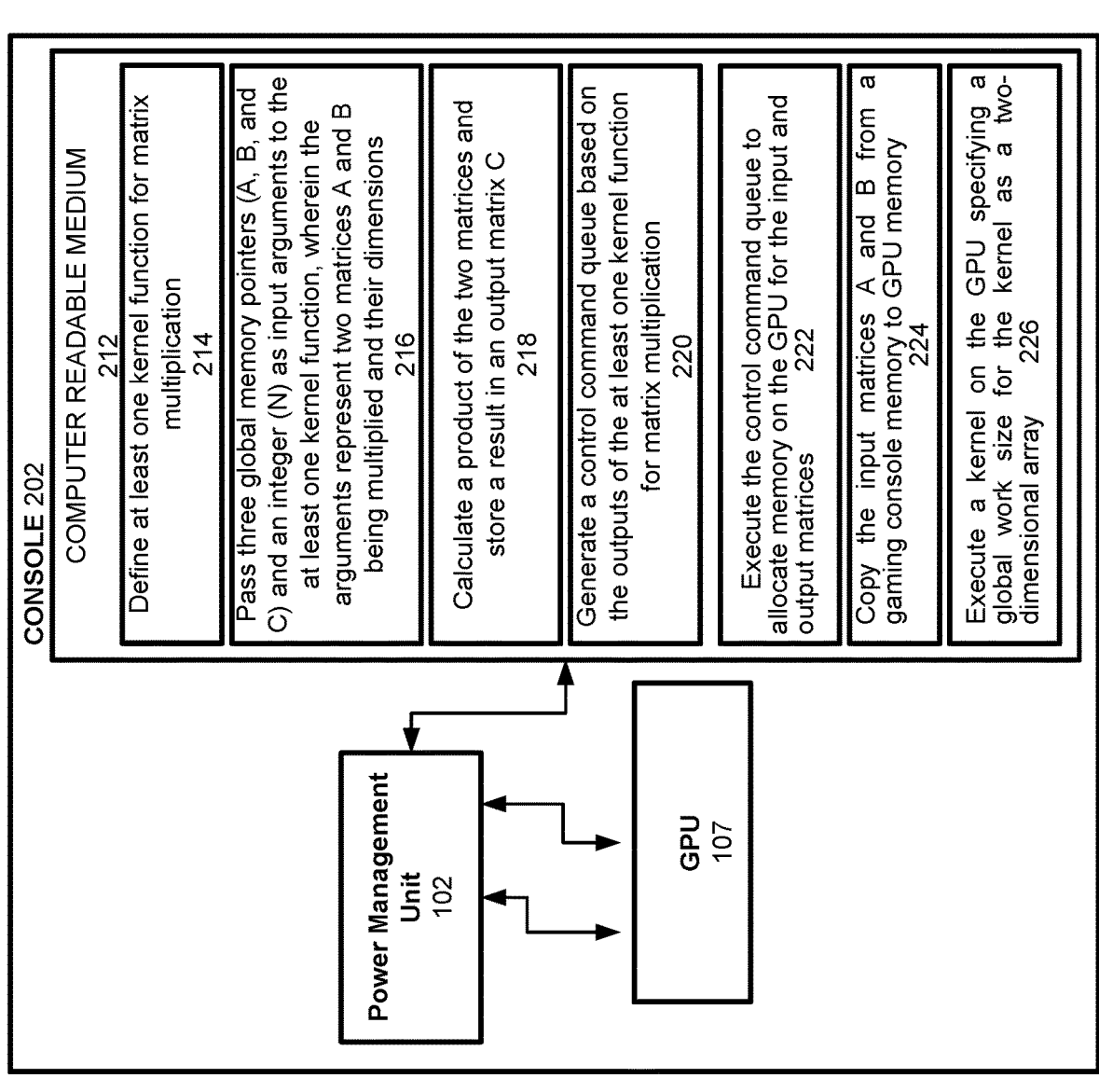
FIG. 2 illustrates a network diagram of a system including detailed features of a gaming console configured to reallocate GPU power consistent with the present disclosure.

FIG. 2 illustrates a network diagram of a system including detailed features of a gaming console configured to reallocate GPU power consistent with the present disclosure.

Referring to FIG. 2, the example system 200 includes a console 202, the power management unit 102 connected to GPU 107. As discussed above with respect to FIG. 1, the power management unit 102 may be configured by the cores of the console 202 to generate control commands to the GPU 104. The control command may reallocate the GPU 104 power from a game display to non-gaming devices and tasks.

While this example describes in detail only one console 102, multiple such nodes may be connected to a network. It should be understood that the console 102 may include additional components and that some of the components described herein may be removed and/or modified without departing from a scope of the console 102 disclosed herein. The console 102 may be a computing device or a server computer, or the like, and may include a processor, which may be a semiconductor-based microprocessor, a central processing unit (CPU), an application specific integrated circuit (ASIC), a field-programmable gate array (FPGA), and/or another hardware device. Although a single processor may be used, it should be understood that the console 102 may include multiple processors, multiple cores, or the like, without departing from the scope of the console 102 system.

The console 102 may also include a non-transitory computer readable medium 212 that may have stored thereon machine-readable instructions executable by the processor. Examples of the machine-readable instructions are shown as 214-226 and are further discussed below. Examples of the non-transitory computer readable medium 212 may include an electronic, magnetic, optical, or other physical storage device that contains or stores executable instructions. For example, the non-transitory computer readable medium 212 may be a Random-Access memory (RAM), an Electrically Erasable Programmable Read-Only Memory (EEPROM), a hard disk, an optical disc, or other type of storage device.

The processor may fetch, decode, and execute the machine-readable instructions 214 to define at least one kernel function for matrix multiplication. The processor may fetch, decode, and execute the machine-readable instructions 216 to pass three global memory pointers (A, B, and C) and an integer (N) as input arguments to the at least one kernel function, wherein the arguments represent two matrices A and B being multiplied and their dimensions. The processor may fetch, decode, and execute the machine-readable instructions 218 to calculate a product of the two matrices and store a result in an output matrix C. The processor 204 may fetch, decode, and execute the machine-readable instructions 220 to generate a control command queue based on the outputs of the at least one kernel function for matrix multiplication.

The processor may fetch, decode, and execute the machine-readable instructions 222 to execute the control command queue to allocate memory on the GPU for the input and output matrices. The processor may fetch, decode, and execute the machine-readable instructions 224 to copy the input matrices A and B from a gaming console memory to GPU memory. The processor may fetch, decode, and execute the machine-readable instructions 226 to execute a kernel on the GPU specifying a global work size for the kernel as a two-dimensional array.

Figure 3A:
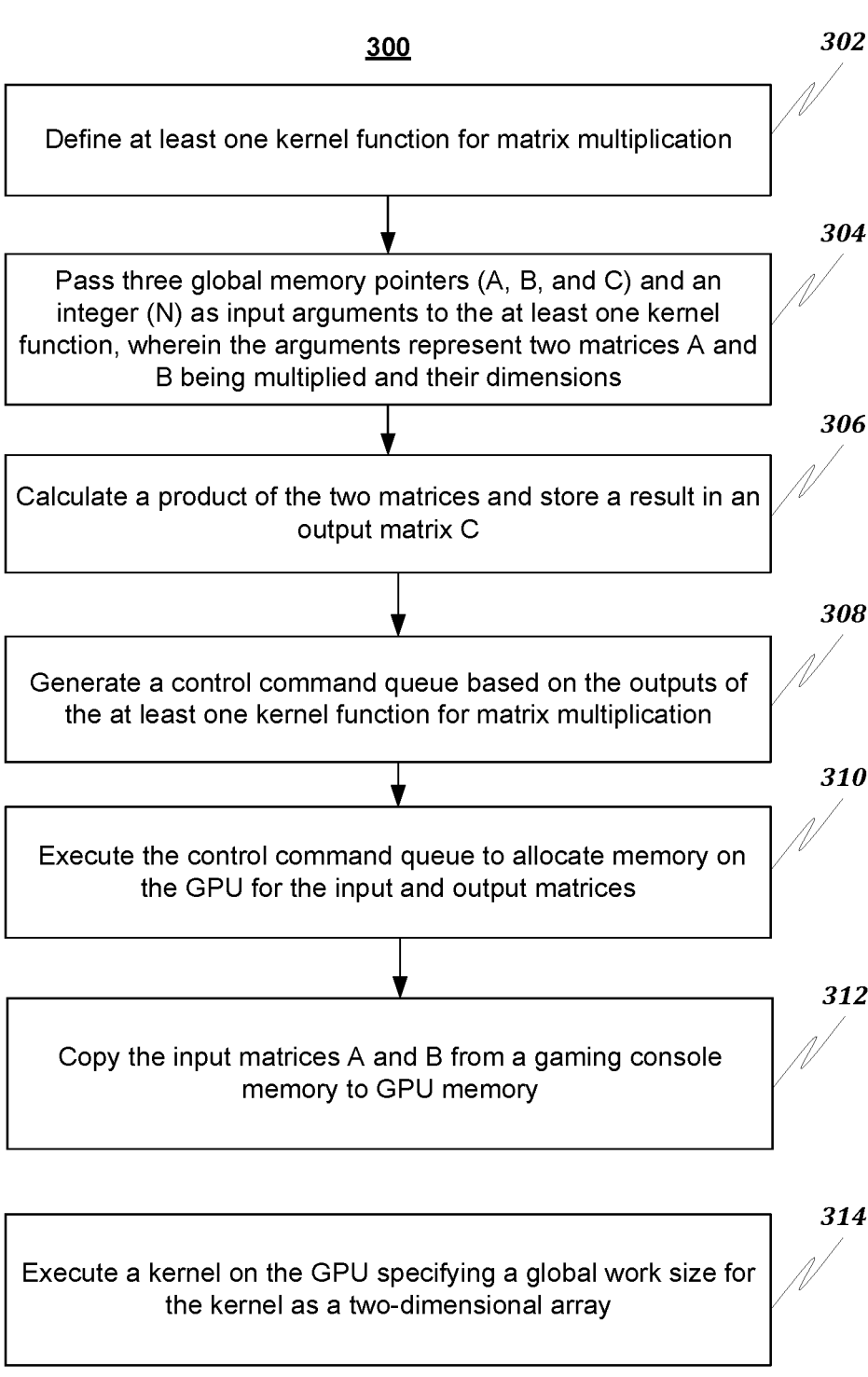
FIG. 3A illustrates a flowchart of a method for reallocation of GPU power for non-gaming purposes consistent with the present disclosure.

FIG. 3A illustrates a flowchart of a method for reallocation of GPU power for non-gaming purposes consistent with the present disclosure.

Referring to FIG. 3A, the method 300 may include one or more of the steps described below. FIG. 3A illustrates a flow chart of an example method executed by the console 102 (see FIG. 2). It should be understood that method 300 depicted in FIG. 3A may include additional operations and that some of the operations described therein may be removed and/or modified without departing from the scope of the method 300. The description of the method 300 is also made with reference to the features depicted in FIG. 2 for purposes of illustration. Particularly, the processor of the console 102 may execute some or all of the operations included in the method 300.

Figure 3B:
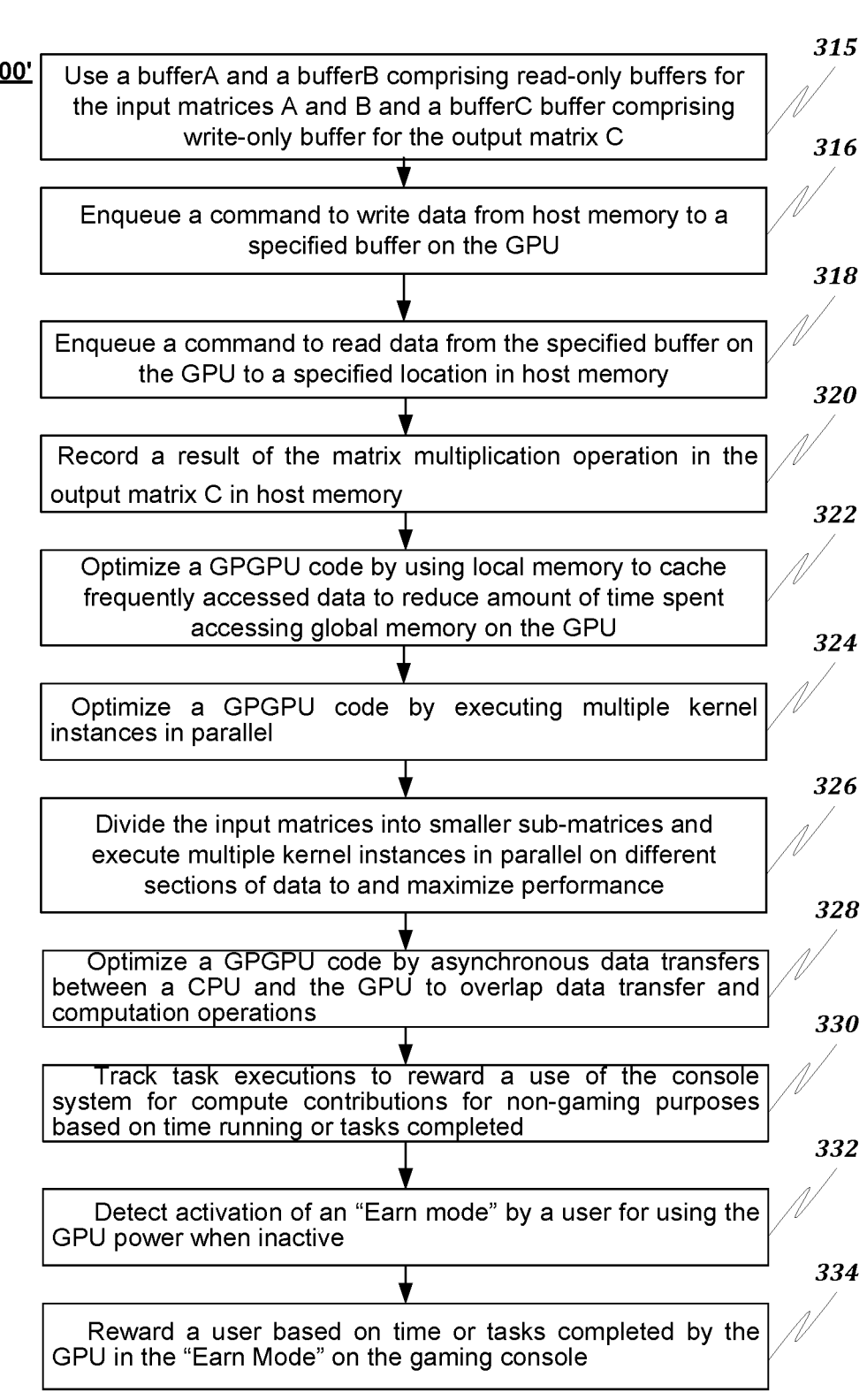
FIG. 3B illustrates a further flowchart of a method for reallocation of GPU power for non-gaming purposes consistent with the present disclosure.

With reference to FIG. 3A, at block 302, the processor may define at least one kernel function for matrix multiplication. At block 304, the processor may pass three global memory pointers (A, B, and C) and an integer (N) as input arguments to the at least one kernel function, wherein the arguments represent two matrices A and B being multiplied and their dimensions. At block 306, the processor may calculate a product of the two matrices and store a result in an output matrix C. At block 308, the processor may generate a control command queue based on the outputs of the at least one kernel function for matrix multiplication. At block 310, the processor may execute the control command queue to allocate memory on the GPU for the input and output matrices. At block 312, the processor may copy the input matrices A and B from a gaming console memory to GPU memory. At block 314, the processor may execute a kernel on the GPU specifying a global work size for the kernel as a two-dimensional array.

reallocation of GPU power for non-gaming purposes consistent with the present disclosure. Referring to FIG. 3B, the method 300' may include one or more of the steps described below. FIG. 3B illustrates a flow chart of an example method executed by the console 102 (see FIG. 2). It should be understood that method 300' depicted in FIG. 3B may include additional operations and that some of the operations described therein may be removed and/or modified without departing from the scope of the method 300'. The description of the method 300' is also made with reference to the features depicted in FIG. 2 for purposes of illustration. Particularly, the processor of the console 102 may execute some or all of the operations included in the method 300'.

With reference to FIG. 3B, at block 315, the processor may use a bufferA and a bufferB comprising read-only buffers for the input matrices A and B and a bufferC buffer comprising write-only buffer for the output matrix C. At block 316, the processor may enqueue a command to write data from host memory to a specified buffer on the GPU. At block 318, the processor may enqueue a command to read data from the specified buffer on the GPU to a specified location in host memory. At block 320, the processor may record a result of the matrix multiplication operation in the output matrix C in host memory.

At block 322, the processor may optimize a GPGPU code by using local memory to cache frequently accessed data to reduce amount of time spent accessing global memory on the GPU. At block 324, the processor may optimize a GPGPU code by executing multiple kernel instances in parallel. At block 326, the processor may divide the input matrices into smaller sub-matrices and execute multiple kernel instances in parallel on different sections of data to and maximize performance. At block 328, the processor may optimize a GPGPU code by asynchronous data transfers between a CPU and the GPU to overlap data transfer and computation operations. At block 330, the processor may track task executions to reward a use of the console system for compute contributions for non-gaming purposes based on time running or tasks completed. At block 332, the processor may detect activation of an "Earn mode" by a user for using the GPU power when inactive. At block 334, the processor may reward a user based on time or tasks completed by the GPU in the "Earn Mode" on the gaming console.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

What is claimed is:

1. A system for reallocating GPU power of a gaming console to non-gaming purposes, comprising:

a processor of the gaming console comprising a GPU;

a memory on which are stored machine-readable instructions that when executed by the processor, cause the processor to:

define at least one kernel function for matrix multiplication;

pass three global memory pointers (A, B, and C) and an integer (N) as input arguments to the at least one kernel function, wherein the arguments represent two matrices A and B being multiplied and their dimensions;

calculate a product of the two matrices and store a result in an output matrix C;

generate a control command queue based on the outputs of the at least one kernel function for matrix multiplication;

execute the control command queue to allocate memory on the GPU for the input and output matrices;

copy the input matrices A and B from a gaming console memory to GPU memory; and execute a kernel on the GPU specifying a global work size for the kernel as a two-dimensional array.

2. The system of claim 1, wherein the instructions further cause the processor to use a bufferA and a bufferB comprising read-only buffers for the input matrices A and B and a bufferC buffer comprising write-only buffer for the output matrix C.

3. The system of claim 2, wherein the instructions further cause the processor to enqueue a command to write data from host memory to a specified buffer on the GPU.

4. The system of claim 3, wherein the instructions further cause the processor to enqueue a command to read data from the specified buffer on the GPU to a specified location in host memory.

5. The system of claim 1, wherein the instructions further cause the processor to record a result of the matrix multiplication operation in the output matrix C in host memory.

6. The system of claim 1, wherein the instructions further cause the processor to optimize a GPGPU code by using local memory to cache frequently accessed data to reduce amount of time spent accessing global memory on the GPU.

7. The system of claim 1, wherein the instructions further cause the processor to optimize a GPGPU code by executing multiple kernel instances in parallel.

8. The system of claim 7, wherein the instructions further cause the processor to divide the input matrices into smaller sub-matrices and execute multiple kernel instances in parallel on different sections of data to and maximize performance.

9. The system of claim 1, wherein the instructions further cause the processor to optimize a GPGPU code by asynchronous data transfers between a CPU and the GPU to overlap data transfer and computation operations.

10. The system of claim 1, wherein the instructions further cause the processor to track task executions to reward the user for usage of the console system for compute contributions for non-gaming purposes based on time running or tasks completed.

11. The system of claim 1, wherein the instructions further cause the processor to detect activation of an "Earn mode" by a user for using the GPU power when inactive.

12. The system of claim 11, wherein the instructions further cause the processor to reward a user based on time or tasks completed by the GPU in the "Earn Mode" on the gaming console.

13. A method for reallocating GPU power of a gaming console to non-gaming purposes, comprising:

defining at least one kernel function for matrix multiplication;

passing three global memory pointers (A, B, and C) and an integer (N) as input arguments to the at least one kernel function, wherein the arguments represent two matrices A and B being multiplied and their dimensions;

calculating a product of the two matrices and storing a result in an output matrix C;

generating a control command queue based on the output matrix C;

executing the control command queue to allocate memory on the GPU for the input and output matrices;

copying the input matrices A and B from a gaming console memory to GPU memory; and executing a kernel on the GPU specifying a global work size for the kernel as a two-dimensional array.

14. The method of claim 13, further comprising using a bufferA and a bufferB comprising read-only buffers for the input matrices A and B and a bufferC buffer comprising write-only buffer for the output matrix C.

15. The method of claim 13, further comprising enqueueing a command to write data from host memory to a specified buffer on the GPU.

16. The method of claim 15, further comprising enqueueing a command to read data from the specified buffer on the GPU to a specified location in host memory.

17. The method of claim 13, further comprising detecting activation of an "Earn mode" by a user for using the GPU power when inactive.

18. The method of claim 17, further comprising rewarding the user based on time or tasks completed by the GPU in the "Earn Mode" on the gaming console.

19. A non-transitory computer readable medium comprising instructions, that when read by a processor, cause the processor to perform:

defining at least one kernel function for matrix multiplication;

passing three global memory pointers (A, B, and C) and an integer (N) as input arguments to the at least one kernel function, wherein the arguments represent two matrices A and B being multiplied and their dimensions;

calculating a product of the two matrices and storing a result in an output matrix C;

generating a control command queue based on the output matrix C;

executing the control command queue to allocate memory on the GPU for the input and output matrices;

copying the input matrices A and B from a gaming console memory to GPU memory; and executing a kernel on the GPU specifying a global work size for the kernel as a two-dimensional array.

20. The non-transitory computer readable medium of claim 18, further comprising instructions, that when read by the processor, cause the processor to detect activation of an "Earn mode" by a user for using the GPU power when inactive and reward the user based on time or tasks completed by the GPU in the "Earn Mode" on the gaming console.

* * * * *